US009770800B2

(12) United States Patent
Castle et al.

(10) Patent No.: US 9,770,800 B2
(45) Date of Patent: Sep. 26, 2017

(54) LASER SIGNATURE VISION SYSTEM

(71) Applicant: The Boeing Company, Chicago, IL (US)

(72) Inventors: James B. Castle, Saint Charles, MO (US); Dennis R. Mathis, Saint Peters, MO (US); Richard J. Steckel, Washington, MO (US)

(73) Assignee: THE BOEING COMPANY, Chicago, IL (US)

( * ) Notice: Subject to any disclaimer, the term of this patent is extended or adjusted under 35 U.S.C. 154(b) by 265 days.

(21) Appl. No.: 14/551,073

(22) Filed: Nov. 23, 2014

(65) Prior Publication Data

US 2015/0078845 A1 Mar. 19, 2015

Related U.S. Application Data

(62) Division of application No. 12/625,828, filed on Nov. 25, 2009, now Pat. No. 8,899,886.

(51) Int. Cl.
| *B23B 35/00* | (2006.01) |
| *G01B 11/14* | (2006.01) |
| *B23Q 17/24* | (2006.01) |
| *B23B 49/00* | (2006.01) |

(52) U.S. Cl.
CPC .......... *B23Q 17/2409* (2013.01); *B23B 35/00* (2013.01); *B23B 49/00* (2013.01); *B23B 2215/04* (2013.01); *B23B 2260/092* (2013.01); *B23B 2270/48* (2013.01); *B23Q 17/2414* (2013.01); *Y10T 408/03* (2015.01); *Y10T 408/16* (2015.01); *Y10T 408/175* (2015.01); *Y10T 408/21* (2015.01)

(58) Field of Classification Search
CPC ... B23B 2260/092; B23B 49/00; B23B 35/00; B23B 2215/04; B23B 2270/48; B23Q 17/2233; B23Q 17/2409; B23Q 17/2414; G05B 2219/45035; G05B 2219/31048; G05B 19/402; G05B 19/4205; G05B 2219/37564; Y10T 408/16; Y10T 408/175; Y10T 408/03
See application file for complete search history.

(56) References Cited

U.S. PATENT DOCUMENTS

| 5,736,279 | A | * | 4/1998 | Mott | ........................ | G01R 3/00 |
| | | | | | | 324/756.04 |
| 2003/0108395 | A1 | | 6/2003 | Douglas et al. | | |
| 2005/0282084 | A1 | * | 12/2005 | Barr | ........................ | G03C 1/73 |
| | | | | | | 430/270.1 |
| 2006/0104734 | A1 | | 5/2006 | Mathis et al. | | |
| 2006/0108509 | A1 | * | 5/2006 | Frangioni | ............ | A61B 5/0059 |
| | | | | | | 250/208.1 |

* cited by examiner

Primary Examiner — Sunil K Singh
Assistant Examiner — Paul M Janeski
(74) Attorney, Agent, or Firm — Yee & Associates, P.C.

(57) ABSTRACT

The different advantageous embodiments may provide an apparatus comprising a vision system, a drilling tool, and a system controller. The vision system may be configured to generate data about a number of laser signatures on a surface of a workpiece. The drilling tool may be configured to drill a number of holes in the surface of the workpiece. The system controller may be configured to generate drilling instructions for the drilling tool using the data generated by the vision system.

17 Claims, 6 Drawing Sheets

LASER SIGNATURE VISION SYSTEM

This application is a divisional application of U.S. patent application Ser. No. 12/625,828, filed Nov. 25, 2009.

BACKGROUND INFORMATION

1. Field

The present disclosure relates generally to drilling and, in particular, to an automated system for identifying laser signatures. Still more particularly, the present disclosure relates to a method and apparatus for automated drilling using a laser signature vision system.

2. Background

Automated drills may utilize a vision system to target a pilot hole or a visible mark on a workpiece used as a hole location designator. Laser projection has also been demonstrated as an effective way to locate where holes are to be drilled on a workpiece. Visible laser projection may require a line of sight between the laser projection and the workpiece. When the drill is moved into position to drill a hole, the drill head may block access for the laser projection to the surface of the workpiece.

In order to alleviate line of sight issues, non-optimal projection angles can be used to project the laser onto the surface from a different angle than the drill angle or at low incidence angles. Significant accuracy penalties may be incurred for the laser projection and the resulting drilled hole when using non-optimal projection angles.

Therefore, it would be advantageous to have a method and apparatus that takes into account one or more of the issues discussed above, as well as possibly other issues.

SUMMARY

The different advantageous embodiments may provide a method for drilling. A drilling system may be positioned at a location of a surface of a workpiece. An image of the surface may be captured. A laser signature may be identified on the surface using the image. Drilling instructions may be generated based on the laser signature. A number of holes may be drilled in the workpiece using the drilling instructions.

The different advantageous embodiments may further provide an apparatus comprising a vision system, a drilling tool, and a system controller. The vision system may be configured to generate data about a number of laser signatures on a surface of a workpiece. The drilling tool may be configured to drill a number of holes in the surface of the workpiece. The system controller may be configured to generate drilling instructions for the drilling tool using the data generated by the vision system.

The features, functions, and advantages may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
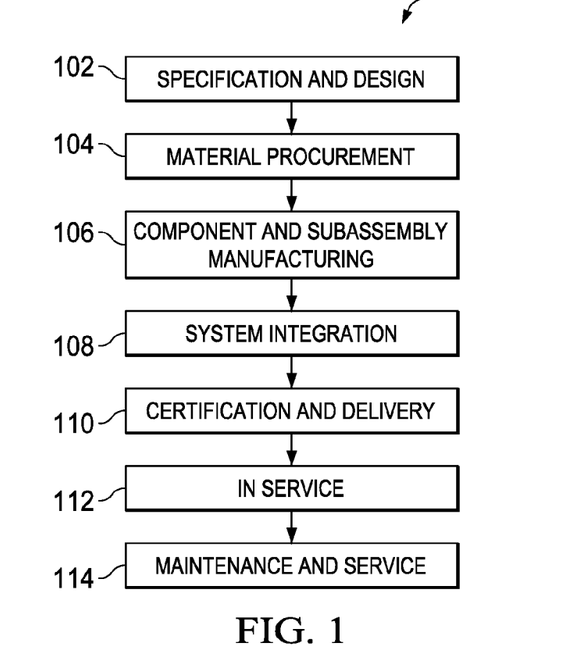
FIG. 1 is an illustration of an aircraft manufacturing and service method in accordance with an advantageous embodiment.
Figure 2:
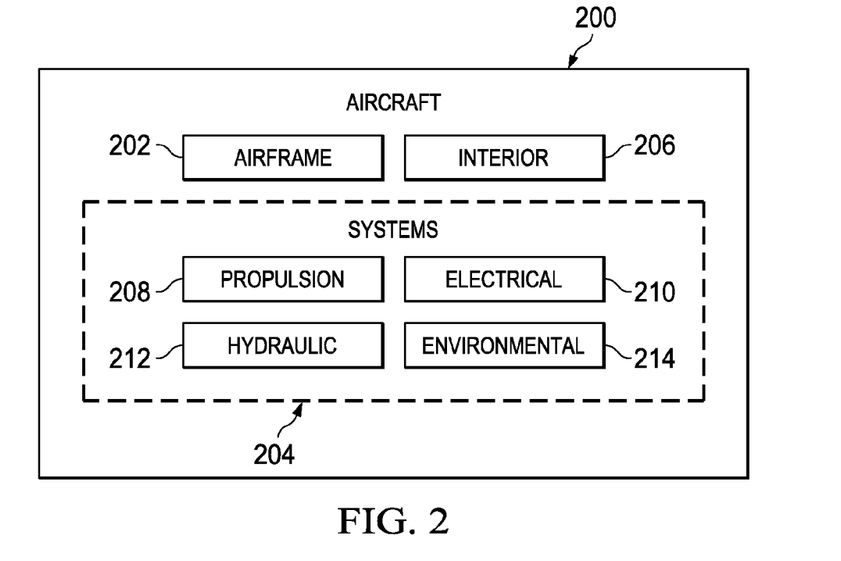
FIG. 2 is illustration of an aircraft in which an advantageous embodiment may be implemented.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 may take place. Thereafter, aircraft 200 in FIG. 2 may go through certification and delivery 110 in order to be placed in service 112. While in service by a customer, aircraft 200 in FIG. 2 may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 may be produced by aircraft manufacturing and service method 100 in FIG. 1 and may include airframe 202 with a plurality of systems 204 and interior 206. Examples of systems 204 may include one or more of propulsion system 208, electrical system 210, hydraulic system 212, and environmental system 214. Any number of other systems may be included. Although an aerospace example is shown, different advantageous embodiments may be applied to other industries, such as the automotive industry. Additionally, different advantageous embodiments may be applied to other infrastructure industries, such as bridges and buildings.

Apparatus and methods embodied herein may be employed during any one or more of the stages of aircraft manufacturing and service method 100 in FIG. 1. For example, components or subassemblies produced in component and subassembly manufacturing 106 in FIG. 1 may be reworked while aircraft 200 is in maintenance and service 114 in FIG. 1.

Also, one or more apparatus embodiments, method embodiments, or a combination thereof may be utilized during service stages, such as maintenance and service 114 and in service 112 in FIG. 1, for example, without limitation, by substantially expediting the maintenance of aircraft 200.

The different advantageous embodiments recognize and take into account a number of different considerations. For example, the different advantageous embodiments recognize and take into account that currently used methods may attempt to alleviate line of sight issues with non-optimal laser projection angles. Non-optimal projection angles may be used to project the laser onto the surface from a different angle than the drill angle. Significant accuracy penalties may be incurred for the laser projection and the resulting drilled hole when using non-optimal projection angles.

Therefore, the different advantageous embodiments may provide a method for drilling. A drilling system may be positioned at a location of a surface of a workpiece. An image of the surface may be captured. A laser signature may be identified on the surface using the image. Drilling instructions may be generated based on the laser signature. A number of holes may be drilled in the workpiece using the drilling instructions.

The different advantageous embodiments may further provide an apparatus comprising a vision system, a drilling tool, and a system controller. The vision system may be configured to generate data about a number of laser signatures on a surface of a workpiece. The drilling tool may be configured to drill a number of holes in the surface of the workpiece. The system controller may be configured to generate drilling instructions for the drilling tool using the data generated by the vision system.

As a specific illustrative example, one or more of the different advantageous embodiments may be implemented, for example, without limitation, during component and subassembly manufacturing 106, system integration 108, and maintenance and service 114 in FIG. 1 to assemble a structure for aircraft 200. As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

Figure 3:
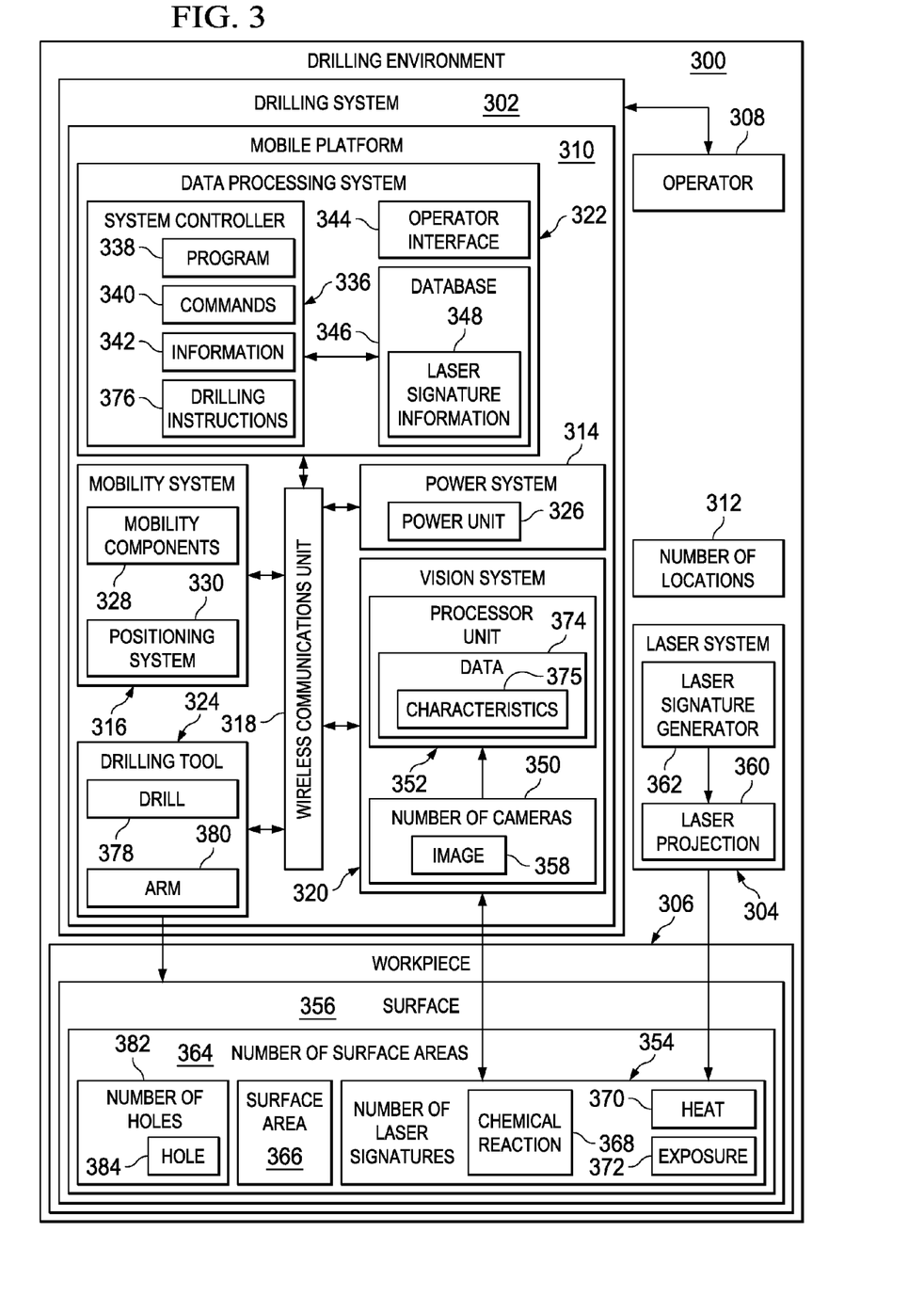
FIG. 3 is an illustration of a drilling environment in accordance with an advantageous embodiment.

FIG. 3 is an illustration of a drilling environment in accordance with an advantageous embodiment. Drilling environment 300 may be any environment in which holes are drilled into a structure, such as aircraft 200 in FIG. 2, for example.

Drilling environment 300 may include drilling system 302, laser system 304, and workpiece 306. Drilling system 302 may be moved initially into place adjacent to workpiece 306 by operator 308. Mobile platform 310 may move drilling system 302 from one location to another location within number of locations 312. Number of locations 312 may include, for example, without limitation, locations near and/or adjacent to workpiece 306. As used herein, number of refers to one or more locations. Workpiece 306 may be, for example, without limitation, a skin, spar, wing, fuselage, rib, and/or any other suitable workpiece or workpiece combination for drilling holes.

Mobile platform 310 may include power system 314, mobility system 316, wireless communications system 318, vision system 320, data processing system 322, drilling tool 324, and/or other suitable components. Power system 314 may provide power to operate drilling system 302. Power system 314 may generate power using power unit 326. Power unit 326 may be rechargeable, removable and/or replaceable. Power unit 326 may be changed when power unit 326 becomes depleted. Power unit 326 may be, for example, without limitation, a battery and/or some other suitable type of power unit. For example, power unit 326 may be a wireless transfer unit capable of receiving power without using wires.

Mobility system 316 may provide mobility for components of drilling system 302, such as mobile platform 310, vision system 320, and/or drilling tool 324. Mobility system 316 may take various forms. Mobility system 316 may include, for example, without limitation, mobility components 328 and positioning system 330.

Mobility components 328 may provide mobile platform 310 with the capability to move drilling system 302 in a number of directions and/or number of locations. Mobility components 328 may be, for example, without limitation, wheels, tracks, feet, rotors, air floats, casters, and/or other suitable components.

Positioning system 330 may be used to move vision system 320 and/or drilling tool 324 in response to commands from data processing system 322. Positioning system 330 may include, for example, without limitation, linear actuators, rotary actuators, ball screws, belt drives, guides, motors, and/or any other suitable positioning component. Positioning system 330 may provide a number of degrees of motion to drilling tool 324 and/or vision system 320. For example, in one advantageous embodiment, positioning system 330 may provide five degrees of motion. In another advantageous embodiment, positioning system 330 may provide six degrees of motion.

Data processing system 322 may control the operation of drilling system 302 using system controller 336 to execute program 338 and transmit commands 340 in these examples. Program 338 may be received from an operator, such as operator 308, using operator interface 344 through wireless communications unit 318, from database 346, and/or some other source. Operator 308 may be, without limitation, a human operator, an autonomous machine operator, a robotic operator, or some other external system. Wireless communications unit 318 may receive and transmit information between components of drilling system 302 and/or operator 308.

In these illustrative examples, wireless communications unit 318 may provide the capability to transfer information, such as program 338 and commands 340, between different components of drilling system 302, such as mobility system 316, vision system 320, data processing system 322, and drilling tool 324, for example. Database 346 may include laser signature information 348 having programs and/or commands associated with a number of different types of laser signatures identified, for example.

In one advantageous embodiment, program 338 and/or commands 340 may be generated by data processing system 322 based on information 342 received through wireless communications unit 318 and/or some other source. Information 342 may be, for example, information about images captured and/or data generated by vision system 320, such as, for example, without limitation, laser signatures identified on a surface of a workpiece.

Vision system 320 may include number of cameras 350 and processor unit 352. Number of cameras 350 may include, for example, without limitation, infrared cameras, visible light cameras, digital cameras, and/or any other suitable camera with electromagnetic spectrum sensitivities and/or filters to detect number of laser signatures 354. Number of cameras 350 form image 358. In an illustrative example where number of cameras 350 is an infrared camera, image 358 is formed using infrared radiation, rather than visible light. Vision system 320 may use infrared camera 350 to detect number of laser signatures 354 remaining on surface 356 of workpiece 306 after laser projection 360 no longer has a line of sight to surface 356, for example. Laser projection 360 may no longer have a line of sight to surface 356 after drilling system 302 moves into place near and/or adjacent to workpiece 306, for example. Number of laser signatures 354 may be formed on surface 356 of workpiece 306 by laser system 304. Laser system 304 may generate laser projection 360 using laser signature generator 362, for example. Number of laser signatures 354 may remain on surface 356 for an amount of time after laser projection 360 has been removed from surface 356 and/or laser projection 360 is blocked from having a line of sight to surface 356. Vision system 320 may then use infrared camera 350 to detect number of laser signatures 354 when laser projection 360 is blocked from surface 356 by drilling system 302, for example. Thus, the different advantageous embodiments may provide a drilling system that may be configured to detect laser signatures and drill accordingly when a laser projection is blocked by the drilling system and no longer has a line of sight to the surface on which the drilling is to take place. As used herein, number of refers to one or more laser signatures.

In the illustrative example of a laser signature, infrared camera 350 may be utilized to improve an acquired image contrast ratio based on thermal intensity, thus increasing the likelihood of detecting a hole designation for drilling in image 358, for example. In one illustrative example, infrared camera 350 may detect number of laser signatures 354 by showing a noticeable contrast to nearby and surrounding number of surface areas 364 in relation to surface area 366 having number of laser signatures 354 when viewed in the infrared spectrum. As used herein, number of refers to one or more surface areas. In one illustrative example, the noticeable contrast may be due to a temperature difference left as a heat signature from laser projection 360, for example. Number of laser signatures 354 may include, for example, without limitation, chemical reaction 368, heat 370, exposure 372, and/or any other suitable signature remaining after laser projection 360 is blocked and/or no longer has line of sight to surface 356.

Processor unit 352 of vision system 320 may generate data 374 using image 358 obtained by infrared camera 350. Data 374 may include characteristics 375. Characteristics 375 may include information about the number of laser signatures such as, for example, without limitation, the location, number, size, type, instructions detected within the number of laser signatures, and/or any other suitable information. Image 358 and/or data 374 may be transmitted to data processing system 322 using wireless communications unit 318. Image 358 and/or data 374 may be an illustrative example of one implementation of information 342 received by system controller 336. System controller 336 may use information 342 to generate commands 340 and/or program 338. Commands 340 and/or program 338 may include, for example, drilling instructions 376. Drilling instructions 376 may include, for example, without limitation, a location for a hole to be drilled, a type of hole to be drilled, instructions on where to move drilling system 302, and/or any other suitable instructions.

System controller 336 may transmit drilling instructions 376 to drilling tool 324. Drilling tool 324 may include drill 378 and arm 380. Drill 378 may be any type of tool with a rotating drill, or cutting, bit used for drilling holes into various materials. Arm 380 may be an extendable component of drilling tool 324 that may interface with positioning system 330 to allow for positioning and movement of drill 378. Drilling tool 324 may use drilling instructions 376 to drill number of holes 382 at number of surface areas 364 of surface 356 based on number of laser signatures 354 remaining on number of surface areas 364. For example, drilling tool 324 may drill hole 384 into surface area 366. As used herein, number of refers to one or more holes.

The illustration of drilling environment 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, drilling system 302 may be used to drill holes on workpieces for platforms other than aircraft 200 in FIG. 2. Other types of platforms may include, for example, without limitation, ships, submarines, satellites, vehicles, containers, buildings, and/or any other suitable platform for drilling environment 300.

Figure 4:
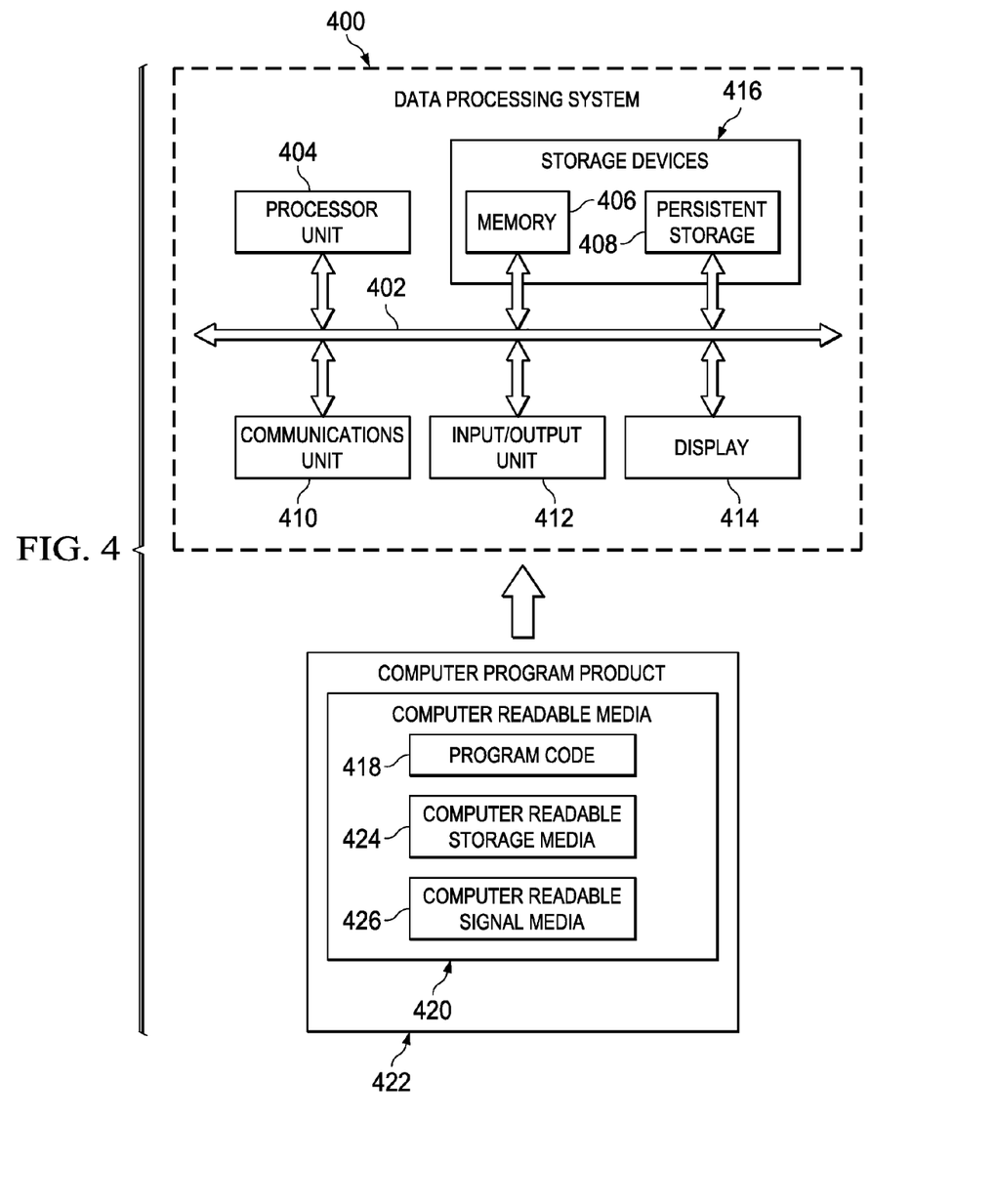
FIG. 4 is an illustration of a data processing system in accordance with an illustrative embodiment.

With reference now to FIG. 4, an illustration of a data processing system is depicted in accordance with an illustrative embodiment. Data processing system 400 may be an illustrative example of one implementation of data processing system 322 in FIG. 3, for example.

In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example without limitation, data, program code in functional form, and/or other suitable information either on a temporary basis and/or a permanent basis. Memory 406, in these examples, may be, for example, a random access memory or any other suitable volatile or non-volatile storage device. Persistent storage 408 may take various forms depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications and/or programs may be located in storage devices 416, which are in communication with processor unit 404 through communications fabric 402. In these illustrative examples the instructions are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code in the different embodiments may be embodied on different physical or tangible computer readable media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422 in these examples. In one example, computer readable media 420 may be computer readable storage media 424 or computer readable signal media 426. Computer readable storage media 424 may include, for example, an optical or magnetic disc that is inserted or placed into a drive or other device that is part of persistent storage 408 for transfer onto a storage device, such as a hard drive, that is part of persistent storage 408. Computer readable storage media 424 also may take the form of a persistent storage, such as a hard drive, a thumb drive, or a flash memory that is connected to data processing system 400. In some instances, computer readable storage media 424 may not be removable from data processing system 400.

Alternatively, program code 418 may be transferred to data processing system 400 using computer readable signal media 426. Computer readable signal media 426 may be, for example, a propagated data signal containing program code 418. For example, computer readable signal media 426 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples.

In some advantageous embodiments, program code 418 may be downloaded over a network to persistent storage 408 from another device or data processing system for use within data processing system 400. For instance, program code stored in a computer readable storage medium in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different advantageous embodiments may be implemented in a data processing system including components in addition to or in place of those illustrated for data processing system 400. Other components shown in FIG. 4 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 400 is any hardware apparatus that may store data. Memory 406, persistent storage 408 and computer readable media 420 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

Figure 5:
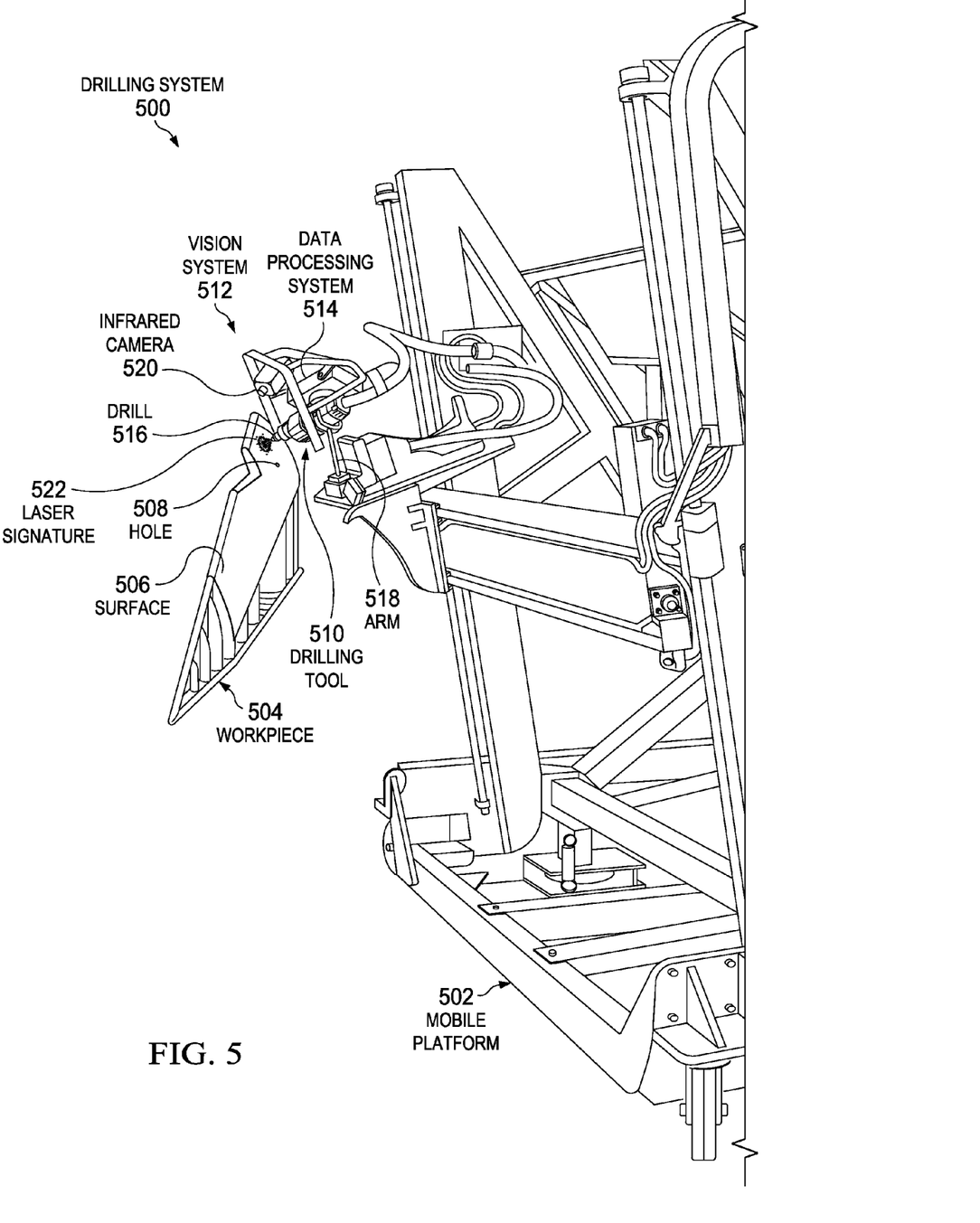
FIG. 5 is an illustration of a drilling system in accordance with an illustrative embodiment.

FIG. 5 is an illustration of a drilling system in accordance with an illustrative embodiment. Drilling system 500 may be an illustrative example of one implementation of drilling system 302 in FIG. 3.

Drilling system 500 may include mobile platform 502. Mobile platform 502 may be an illustrative example of one implementation of mobile platform 310 in FIG. 3. Drilling system 500 may be located adjacent to and/or near workpiece 504. Workpiece 504 may be an illustrative example of one implementation of workpiece 306 in FIG. 3. Drilling system 500 may be configured to drill holes into surface 506 of workpiece 504, for example, such as hole 508.

Drilling system 500 may include drilling tool 510, vision system 512, and data processing system 514. Drilling tool 510 may include drill 516 and arm 518. Drilling tool 510 may be an illustrative example of one implementation of drilling tool 324 in FIG. 3. Drilling tool 510 may be associated with data processing system 514 in this illustrative example.

Vision system 512 may be an illustrative example of one implementation of vision system 320 in FIG. 3. Vision system 512 may include infrared camera 520. Infrared camera 520 may detect laser signature 522 on surface 506. Laser signature 522 may be a result of a laser projection, such as laser projection 360 in FIG. 3, remaining after the laser projection has been blocked and/or no longer has line of sight to surface 506, for example. Infrared camera 520 may generate an image, such as image 358 in FIG. 3, which captures detection of laser signature 522. Vision system 512 may generate data using the image captured by infrared camera 520 and may send the data generated to data processing system 514. Data processing system 514 may be an illustrative example of data processing system 322 in FIG. 3.

Data processing system 514 may use data received from vision system 512 about laser signature 522 to generate drilling instructions, such as drilling instructions 376 in FIG. 3, for drilling tool 510. The drilling instructions may include, for example, without limitation, instructions on positioning drill 516 using positioning system 330 of FIG. 3 to manipulate arm 518, instructions for drilling depth, instructions for drilling location on surface 506, and/or any other suitable drilling instructions. Hole 508 may be an illustrative example of one result of drilling tool 510 executing drilling instructions received from data processing system 514 in response to vision system 512 detecting a laser signature, such as laser signature 522 for example.

The illustration of drilling system 500 in FIG. 5 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, mobile platform 502 may be configured to position drilling tool 510 with axes of different configurations or alternate mechanisms such as a robotic arm, in one advantageous embodiment. In another advantageous embodiment, data processing system 514 may be located remote from drilling tool 510 and/or vision system 512, and may receive data and send instructions using a wireless communications system, such as wireless communications unit 318 in FIG. 3, for example.

Figure 6:
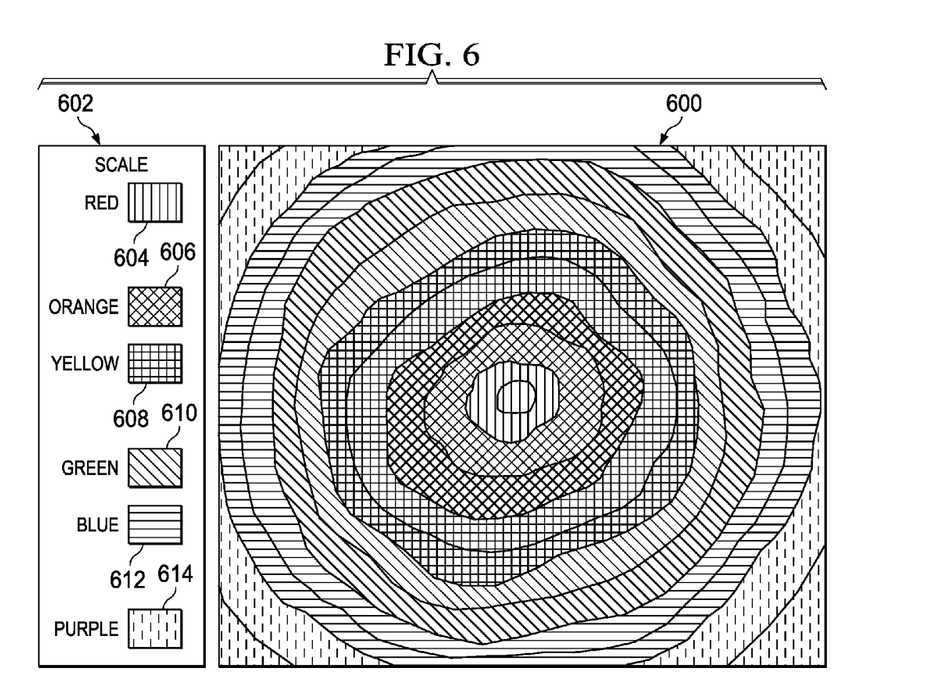
FIG. 6 is an illustration of a laser signature in accordance with an illustrative embodiment.

FIG. 6 is an illustration of a laser signature in accordance with an illustrative embodiment. Laser signature image 600 may be an illustrative example of one implementation of image 358 of number of laser signatures 354 in FIG. 3 and/or laser signature 522 in FIG. 5.

Laser signature image 600 may be an illustrative example of an image of a heat signature, such as heat 370 in FIG. 3. Laser signature image 600 may be detected by a vision system using an infrared camera, such as vision system 320 in FIG. 3 and/or vision system 512 in FIG. 5. Laser signature image 600 may depict a laser signature that may be used as a hole designation on a surface of a workpiece, such as workpiece 306 in FIG. 3, to indicate where a hole is to be drilled by a drilling system, such as drilling system 302 in FIG. 3, for example.

An infrared camera may form an image using infrared radiation rather than visible light. An infrared camera may detect a heat signature based on different temperature measurements of an image. The difference in color may represent temperature measurements of the heat signature, with the warmest parts of the image colored white, intermediate temperatures colored in reds and yellows, and the coolest temperatures colored in blue. A scale may be shown next to a false color image to relate colors to temperatures, in one illustrative example.

In this illustrative example, scale 602 relates red 604, orange 606, yellow 608, green 610, blue 612, and purple 614 to laser signature image 600. Red 604 may be the warmest temperature of the laser signature in laser signature image 600. Blue 612 and purple 614 may be the coolest temperatures of the laser signature in laser signature image 600. Orange 606, yellow 608, and green 610 may be intermediate temperatures between red 604 and the cooler temperatures of blue 612 and purple 614, in this illustrative example.

The illustration of laser signature image 600 in FIG. 6 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, laser signature image 600 may be a chemical reaction with a surface of a workpiece, such as chemical reaction 368 on number of surface areas 364 of workpiece 306 in FIG. 3. In another advantageous embodiment, laser signature image 600 may be an exposure of a surface area, such as exposure 372 in FIG. 3. In yet another advantageous embodiment, the laser signature may be a phase change, such as melted zone, or structure change, such as re-crystallization.

Figure 7:
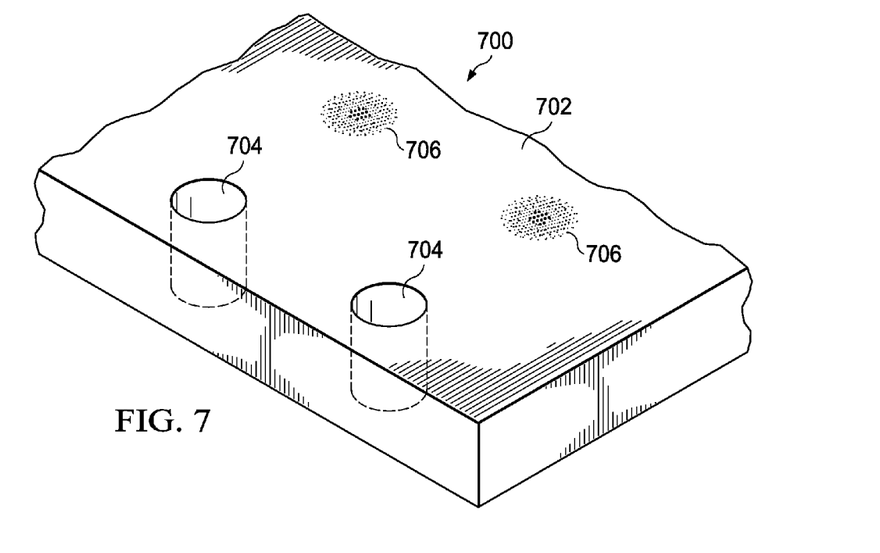
FIG. 7 is an illustration of a workpiece in accordance with an illustrative embodiment.

FIG. 7 is an illustration of a workpiece in accordance with an illustrative embodiment. Workpiece 700 may be an illustrative example of one implementation of workpiece 306 in FIG. 3.

Workpiece 700 includes surface 702 having drilled holes 704 and laser signatures 706. Drilled holes 704 may be an illustrative example of one implementation of number of holes 382 in FIG. 3 and/or hole 508 in FIG. 5. Laser signatures 706 may be an illustrative example of number of laser signatures 354 in FIG. 3 and/or laser signature 522 in FIG. 5.

In this illustrative example, laser signatures 706 may remain after laser projection 360 in FIG. 3 has been removed from surface 702 and/or is blocked from having line of sight to surface 702, for example. Drilling system 302 in FIG. 3 may identify laser signatures 706 remaining on surface 702 using number of cameras 350 to capture image 358, for example. Drilling system 302 in FIG. 3 may use image 358 of laser signatures 706 to identify a number of surface areas where a number of holes are to be drilled, such as number of surface areas 364 in FIG. 3, for example. In this illustrative example, laser signatures 706 may be at surface area 366 of number of surface areas 364 in FIG. 3, while drilled holes 704 represent a different surface area of surface 702.

Drilled holes 704 may represent number of holes 382 drilled by drilling tool 324 in response to drilling instructions 376 in FIG. 3, for example.

The illustration of number of workpiece 700 in FIG. 7 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 8:
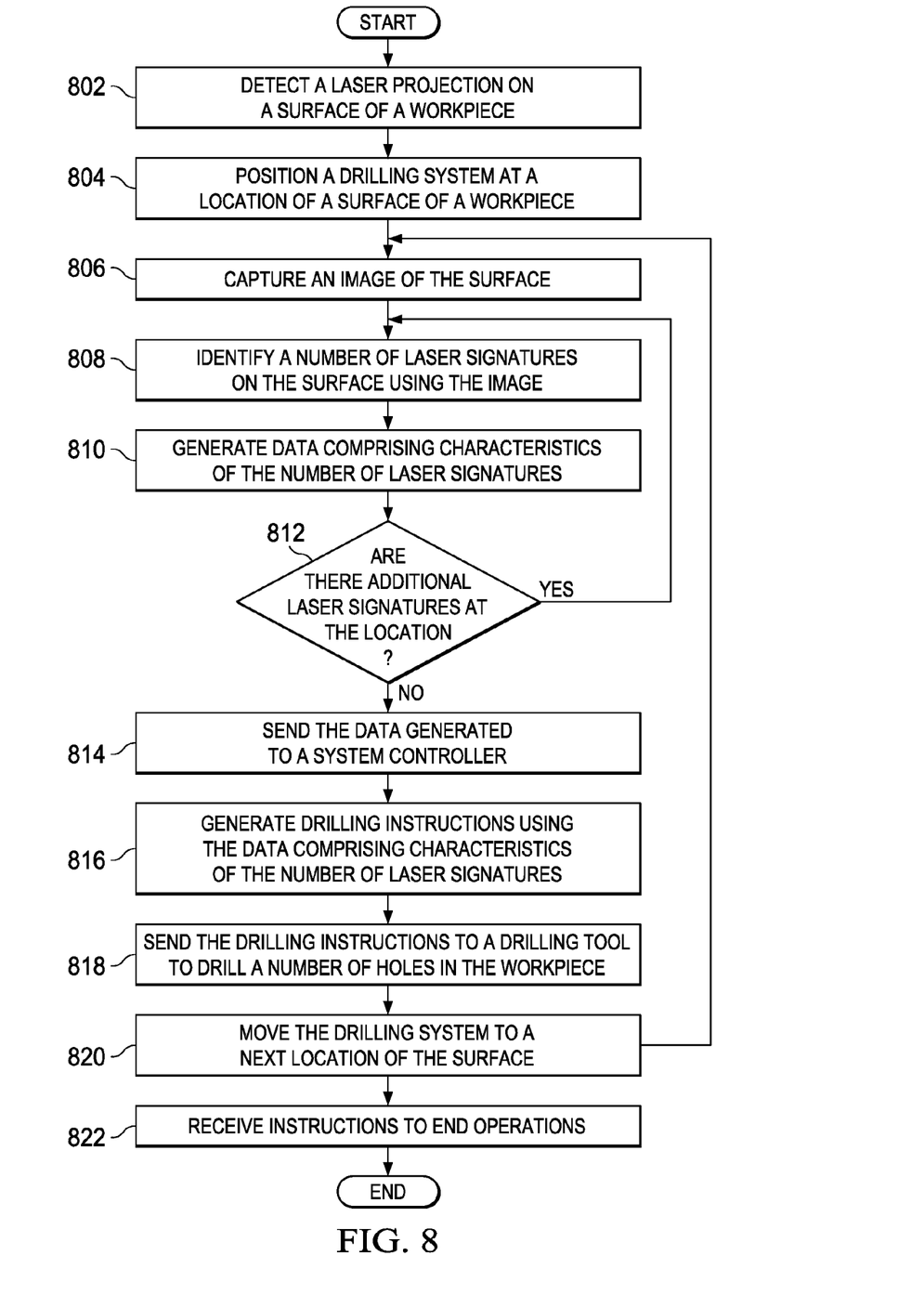
FIG. 8 is an illustration of a flowchart of a process for drilling in accordance with an illustrative embodiment.

FIG. 8 is an illustration of a flowchart of a process for drilling in accordance with an illustrative embodiment. The process in FIG. 8 may be implemented by a component such as drilling system 302 in FIG. 3, for example.

The process begins by detecting a laser projection on a surface of a workpiece (operation 802). Detection of the laser projection may be performed by a vision system, such as vision system 320 in FIG. 3, or by an operator, such as operator 308 in FIG. 3, for example. The process positions a drilling system 302 at a location of a surface 356 of a workpiece 306 (operation 804). The location may be, for example, number of locations 312 adjacent to surface 356 of workpiece 306 in FIG. 3. Drilling system 302 may be positioned at the location by an operator, such as operator 308 in FIG. 3, or autonomously using mobile platform 310 in FIG. 3, for example.

The process captures an image 358 of surface 356 (operation 806). The process may capture the image 358 using a vision system 320 in FIG. 3, having number of cameras 350. The process then identifies a number of laser signatures 354 on the surface 356 using the image 358 (operation 808). The number of laser signatures 354 may be, for example, without limitation, a chemical reaction with the surface of the workpiece, an exposure on the surface of the workpiece, a heat signature, a change of state of the surface of the workpiece, and/or any other suitable signature.

The process generates data 374 comprising characteristics 375 of the number of laser signatures 354 (operation 810). The data 374 comprising characteristics 375 may be generated by vision system 320 in FIG. 3, using image 358 captured of surface 356 containing number of laser signatures 354, for example. Characteristics 375 may include information about the number of laser signatures such as, for example, without limitation, the location, number, size, type, instructions detected within the number of laser signatures, and/or any other suitable information. The process determines whether there are additional laser signatures at the location of the surface (operation 810). If the determination is made that there are additional laser signatures at the location, the process returns to operation 806, and iteratively repeats operations 806 to 810 until all laser signatures for the location have been identified.

If a determination is made that there are no additional laser signatures at the location, the process sends the data 374 generated to a system controller 336 (operation 812). The process generates drilling instructions 376 using the data 374 comprising characteristics 375 of the number of laser signatures 354 (operation 814). The process sends the drilling instructions 376 to a drilling tool 324 to drill a number of holes 382 in the workpiece 306(operation 816). The process moves the drilling system 302 to a next location of the surface 356(operation 818), and returns to operation 804. The process iteratively repeats operations 804 to operation 818 until the process receives instructions to end operations (operation 820), with the process terminating thereafter.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments recognize and take into account that currently used methods may attempt to alleviate line of sight issues with non-optimal laser projection angles. Non-optimal projection angles may be used to project the laser onto the surface from a different angle, other than the drill angle. Less than desired accuracy may be achieved for the laser projection and the resulting drilled hole when using non-optimal projection angles.

Therefore, the different advantageous embodiments may provide a method for drilling. A drilling system may be positioned at a location of a surface of a workpiece. An image of the surface may be captured. A laser signature may be identified on the surface using the image. Drilling instructions may be generated based on the laser signature. A number of holes may be drilled in the workpiece using the drilling instructions.

The different advantageous embodiments may further provide an apparatus comprising a vision system, a drilling tool, and a system controller. The vision system may be configured to generate data about a number of laser signatures on a surface of a workpiece. The drilling tool may be configured to drill a number of holes in the surface of the workpiece. The system controller may be configured to generate drilling instructions for the drilling tool using the data generated by the vision system.

The different advantageous embodiments may take the form of an entirely hardware embodiment, an entirely software embodiment, or an embodiment containing both hardware and software elements. Some embodiments may be implemented in software, which may include but is not limited to forms, such as, for example, firmware, resident software, and microcode.

Furthermore, the different embodiments may take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium may be, for example, without limitation an electronic, magnetic, optical, electromagnetic, infrared, or semiconductor system, or a propagation medium. Non-limiting examples of a computer-readable medium may include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplate.

What is claimed is:

1. An apparatus comprising:
   a vision system configured to generate data about a number of laser signatures on a surface of a workpiece, wherein the vision system identifies the number of laser signatures on the surface of the workpiece using a camera, wherein the camera captures an image of the surface of the workpiece, and wherein the vision system uses the image to identify the number of laser signatures on the surface of the workpiece and generate the data about the number of laser signatures;
   a drilling tool configured to drill a number of holes in the surface of the workpiece; and
   a system controller configured to generate drilling instructions for the drilling tool using the data generated by the vision system, wherein the system controller is configured to determine whether additional laser signatures exist on the surface using the image.

2. The apparatus of claim 1, wherein the vision system identifies the number of laser signatures on the surface of the workpiece using an infrared camera.

3. The apparatus of claim 2, wherein the infrared camera captures an image of the surface of the workpiece, and wherein the vision system uses the image to identify the number of laser signatures on the surface of the workpiece and generate the data about the number of laser signatures.

4. The apparatus of claim 1, wherein the data generated by the vision system is transmitted to the system controller.

5. The apparatus of claim 1 further comprising:
   a mobility system configured to position the apparatus at a number of locations adjacent to the surface of the workpiece.

6. The apparatus of claim 5, wherein the number of laser signatures are generated prior to the mobility system positioning the apparatus at the number of locations, and wherein the number of laser signatures remain on the surface of the workpiece after a laser projection is blocked from having line of sight to the surface of the workpiece.

7. The apparatus of claim 1, wherein the number of laser signatures is at least one of a chemical reaction with the surface of the workpiece, an exposure on the surface of the workpiece, a heat signature, and a change of state of the surface of the workpiece.

8. The apparatus of claim 1, wherein the workpiece is selected from at least one of a skin, spar, wing, fuselage, and rib.

9. The apparatus of claim 1 further comprising:
   a mobile platform connected to the drilling tool and configured to position the drilling tool.

10. The apparatus of claim 9 further comprising:
    an arm connected to the drilling tool and configured to move the drilling tool independently of the mobile platform.

11. The apparatus of claim 10, wherein the system controller is configured to control the arm and the mobile platform.

12. The apparatus of claim 1, wherein the system controller is further configured to generate drilling instructions for the drilling tool based on characteristics of the number of laser signatures.

13. The apparatus of claim 1, wherein the system controller is further configured to generate drilling instructions for the drilling tool based on characteristics of the number of laser signatures.

14. The apparatus of claim 1, wherein the camera comprises an infrared camera.

15. An apparatus comprising:
    a vision system configured to generate data about a number of laser signatures on a surface of a workpiece, wherein the vision system identifies the number of laser signatures on the surface of the workpiece using an infrared camera, wherein the infrared camera captures an image of the surface of the workpiece, wherein the vision system uses the image to identify the number of laser signatures on the surface of the workpiece and generate the data about the number of laser signatures, wherein the number of laser signatures is at least one of a chemical reaction with the surface of the workpiece, an exposure on the surface of the workpiece, a heat signature, and a change of state of the surface of the workpiece;
    a drilling tool configured to drill a number of holes in the surface of the workpiece, wherein the workpiece is selected from at least one of a skin, spar, wing, fuselage, and rib;
    a system controller configured to generate drilling instructions for the drilling tool using the data generated by the vision system, wherein the data generated by the vision system is transmitted to the system controller; and
    a mobility system configured to position the apparatus at a number of locations adjacent to the surface of the workpiece, wherein the number of laser signatures are generated prior to the mobility system positioning the apparatus at the number of locations, and wherein the number of laser signatures remain on the surface of the workpiece after a laser projection is blocked from having line of sight to the surface of the workpiece; and
    wherein the system controller is configured to determine whether additional laser signatures exist at the number of locations using the image.

16. The apparatus of claim 9, further comprising:
    an arm connected to the drilling tool and configured to move the drilling tool independently of the mobile platform.

17. The apparatus of claim 16, wherein the system controller is configured to control the arm and the mobile platform.

\* \* \* \* \*